July 21, 1925.

H. W. TROEGER

PHONOGRAPH STOP DEVICE

Filed Sept. 22, 1924

Inventor

Herman W. Troeger.

By

Attorneys

July 21, 1925.
H. W. TROEGER
PHONOGRAPH STOP DEVICE
Filed Sept. 22, 1924
1,546,761
3 Sheets-Sheet 2
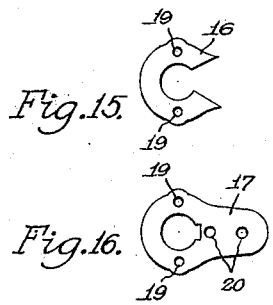
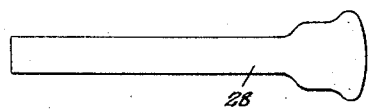
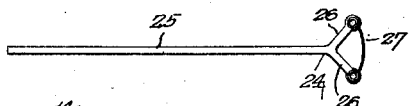
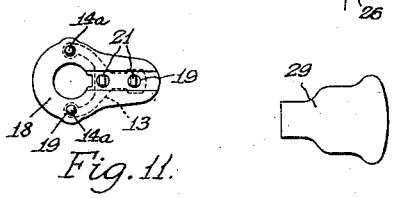
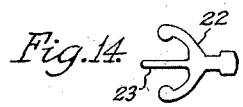
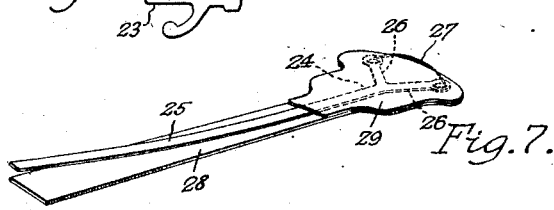
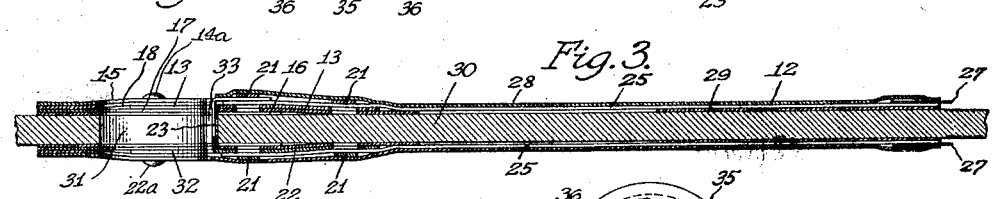
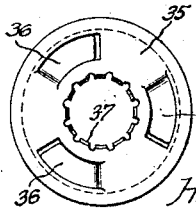
Inventor
Herman W. Troeger,
By
Attorneys

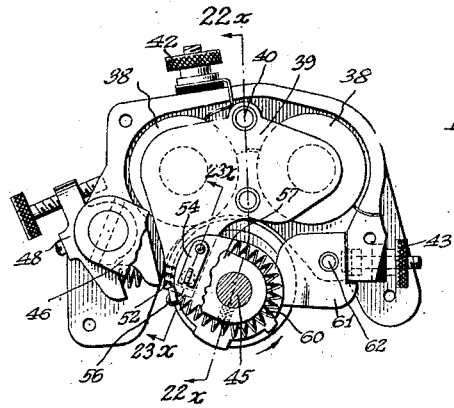
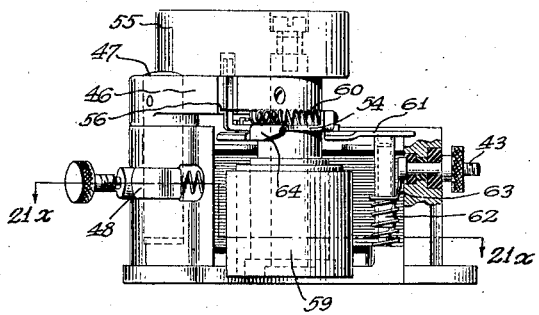
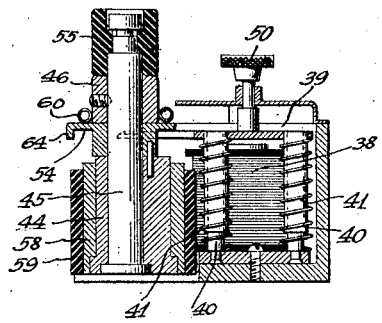
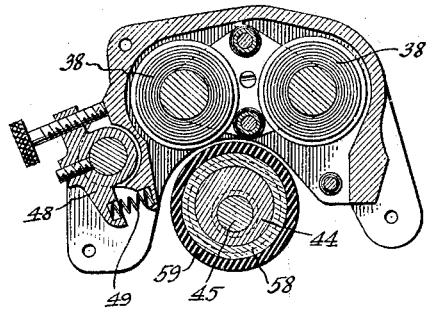
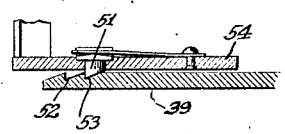

Patented July 21, 1925.

1,546,761

UNITED STATES PATENT OFFICE.

HERMAN W. TROEGER, OF DETROIT, MICHIGAN.

PHONOGRAPH STOP DEVICE.

Application filed September 22, 1924. Serial No. 739,025.

*To all whom it may concern:*

Be it known that I, HERMAN W. TROEGER, a citizen of the United States, residing at Detroit, in the county of Wayne and State of Michigan, have invented certain new and useful Improvements in Phonograph Stop Devices, of which the following is a specification, reference being had therein to the accompanying drawings.

This invention has reference to phonograph stop devices for the purpose of determining the period of and bring about the stopping of a phonograph when the reproducing needle has passed over that portion of a record to the extent required, and for such purpose many devices have been heretofore proposed, both mechanical and electrical, some of which are very complicated or are not readily adaptable to an existing record or machine. Furthermore, in many of such devices, a presetting of the stop mechanism is required prior to the playing of a record in order to insure the stop mechanism being brought into effect at the right moment.

It is, however, very desirable that presetting operations should be rendered unnecessary so that when a record is placed upon a machine and is played the operation of the phonograph will be arrested at the proper time upon the completion of the playing of said record, this period varying with different records and often on the opposite sides of the same record, due to the differing radii of the inner or final grooves of the records. Accordingly it is an object of this invention to provide very simple and efficient means whereby a disk record may be so equipped that the use of said record at any time thereafter will be accompanied by the stopping of the phonograph mechanism immediately upon the needle reaching the final groove, or such other desirable groove of the record, where the said phonograph is provided with electrically controlled means for bringing about the arresting of its operation and in conjunction with the means to which the record is so equipped.

Further objects are to provide an electric conductor adapted to be applied to a record to form a bridge between the central orifice thereof or parts adjacent said orifice and the final groove or any other desired groove of the said record, and also to provide such a device which may be readily adjusted as to length when being so applied to a record; a still further object being to provide such a conductor with a form of mounting whereby it may be protected and readily secured to the surface of the record in the manner and for the purpose suggested.

The invention also aims to provide a novel method of assembling the parts of the device whereby the parts are primarily separate and may be so assembled by the user in the manner called for by the circumstances under which the device is to be used, and whereby a pair of such devices may be utilized on opposite sides of a disk record and electrically associated with one another.

Still further, the invention includes a novel form of stop mechanism adapted to be actuated electrically through the medium of the aforesaid conductor; and other objects subsidiary to or resulting from the aforesaid objects, or from the construction or operation of the invention as it may be carried into effect, will become apparent as said invention is hereinafter further disclosed.

In carrying the said invention into effect I may provide as an attachment for a disk record a conductor in the form of an elongated strip of metal having a forked end carrying a bowed wire, which device is attached to a suitable support; a further forked member which may have a tongue extending therefrom also carried by a suitable support and provided with means for the reception of the end of the metal strip of the first mentioned member whereby the two members may be connected together to form a unit which may be of varied length by the trimming of the length of the first mentioned member to suit requirements, two of the said devices being attachable to a disk record, one on either side thereof, with the said tongue threaded through the central bore of the record and engaged with the member on the opposite side thereof; and a contact ring adapted to be placed upon the turn-table of a phonograph in contact with and around the spindle thereof, the inner parts of both of said conductors being provided with contact points adapted to engage the said ring, when a record equipped with the said device is placed thereon, so that electric connection may be established between the said spindle and the outer end including the bowed wires of the said conductor or conductors. This bowed wire, by reason of adjustment of the length of the conductor when assembling the same, is caused to overlap such groove of the record as may be desired to determine the point at which the phonograph is to be arrested when a reproducing needle is passing over the surface of said record.

I also provide a stop mechanism which includes a movable spring operated brake member adapted to be temporarily set in a released position whereby a phonograph to which it is applied may be permitted to operate and solenoids controlling a latch permitting the reapplying of said brake upon the establishing of an electric circuit through the medium of the conductor hereinbefore referred to; the said device also including means operable together with the latching means to effect the cutting off of said circuit immediately the latch has been released, whereby further consumption of current by the said device is prevented after the said functions have been performed. All of which is more particularly described and ascertained hereinafter, by way of example, having reference to the accompanying drawings, wherein—

Figure 3 is a fragmentary section through a double disk record equipped with conductors, taken on the line $3^x$—$3^x$ of Figure 1;

Figure 4 is a fragmentary section through the record and turntable taken on the line $4^x$—$4^x$, Figure 1;

Figure 5 is an elevation of the contact ring;

Figure 6 is a plan of the underside of the same;

Figure 7 is a perspective detail view illustrating the underside of the outer part of the conductor device;

Figure 8 is a plan view of the metallic forked strip forming the conductor proper removed therefrom;

Figure 9 is a plan of the mount for said strip;

Figure 10 is a plan of the paper blank which encloses the head of said strip;

Figure 11 is a plan of the inner end part of the conductor;

Figure 12 is a perspective view of another form of such inner end part which includes a tongue;

Figure 13 is plan of the metal blank which is incorporated in the said conductor, Figure 11;

Figure 14 is a plan of the metal blank which is incorporated in the conductor, Figure 12;

Figure 15 is a plan of the lower paper blank which is used in the assembling of said members, Figures 11 and 12;

Figures 16 and 17 are plan views of interleaves used in such assemblies;

Figure 18 is a plan of the upper paper blank used in the said assembly;

Figure 19 is a plan view partly broken away of the brake, the cover plate thereof being also removed;

Figure 20 is a front elevation of the same, partly shown in section;

Figure 21 is a horizontal section taken on the line $21^x$—$21^x$ Figure 20;

Figure 22 is a transverse section of the brake on the line $22^x$—$22^x$ Figure 19;

Figure 23 is a sectional detail view of the latch of said brake taken on the line $23^x$—$23^x$ Figure 19.

Similar characters of reference indicate similar parts in the several figures of the drawings and Figures 4, 5, 6, 7, 12 and 13 are drawn to a larger scale than the remaining figures of said drawings.

Figure 1:
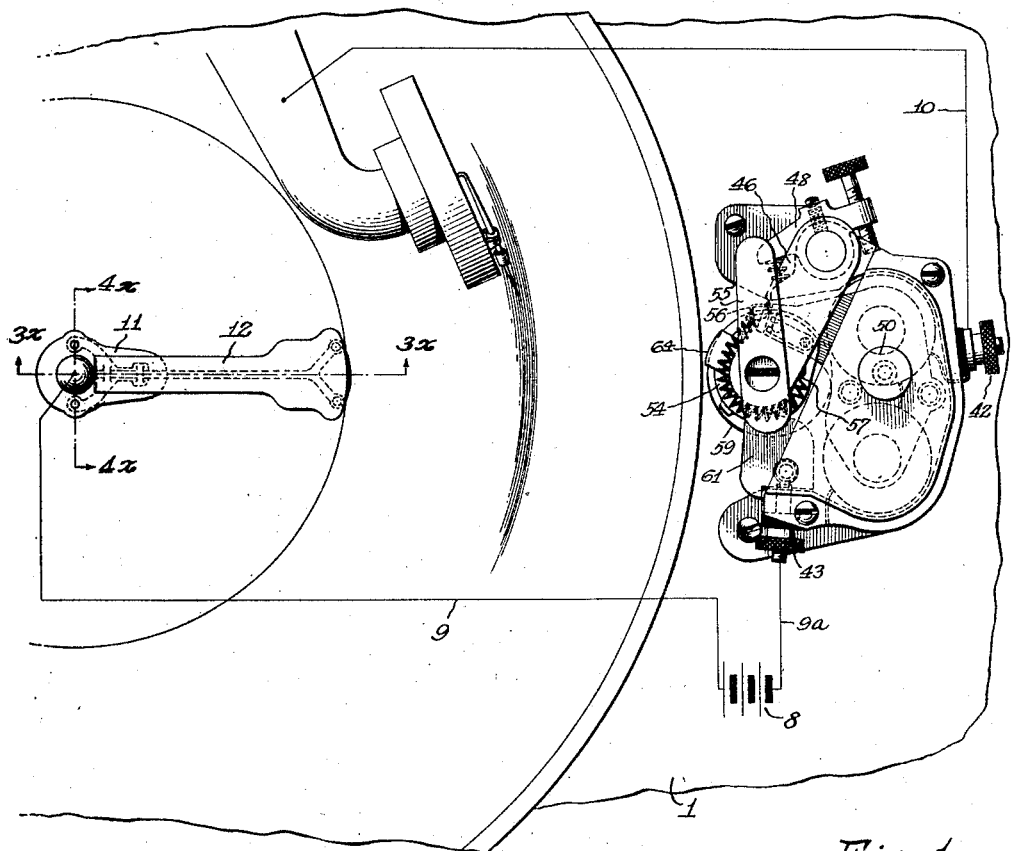
Figure 1 is a fragmentary plan view of part of a phonograph illustrating the application of said invention thereto, only such parts of the phonograph as are necessary for a proper understanding of the operation of the device being illustrated.
Figure 2:
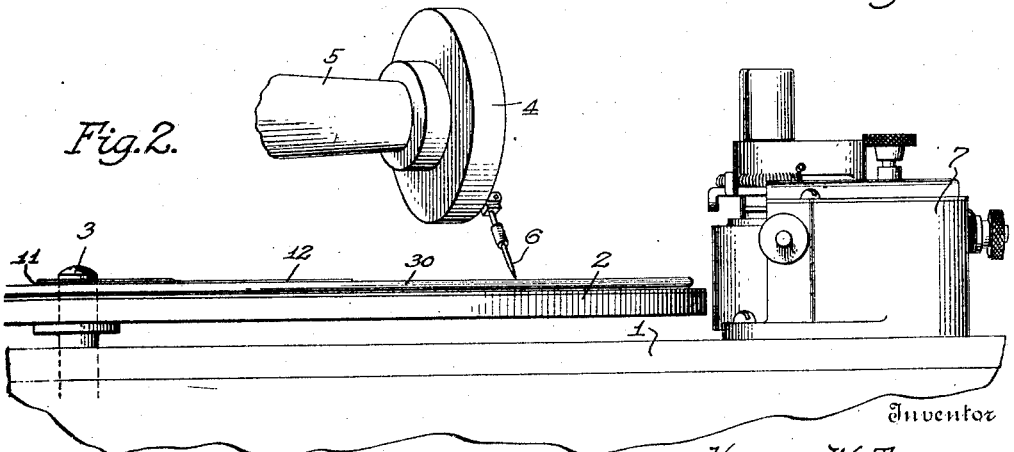
Figure 2 is a fragmentary elevation of the parts shown in Figure 1.

In Figures 1 and 2 part of a phonograph is illustrated wherein 1 indicates the top of the phonograph, 2 the turntable which is mounted on the motor spindle 3 in the usual manner, and 4 the sound box carried by the sound arm 5. 6 is the needle of said sound box.

The apparatus generally numbered 7 is an electric brake adapted to be operated for the securing and releasing of the turntable of the phonograph for the purpose of stopping or permitting the rotation thereof, the said brake being adapted to be electrically controlled through the medium of the battery 8 and wiring 9, $9^a$ and 10 connecting the terminals of said electric brake with the spindle 3 and tone arm 5 respectively of the phonograph directly or indirectly as may be necessary or desirable. The bringing into effect of said electric brake whereby application thereof to the turn-table, or to a disk record carried thereby, is accomplished by the closing of a circuit through the said brake by the establishing of electric connection between the sound arm and the spindle of the motor, and it is desirable that the moment of the establishing of such a circuit should be determined and controlled relative to the physical nature of the record which is being played so that such circuit may be closed upon the completion of the playing of the record. It however often happens that on different records, or on opposite sides of the same record, the radial disposition of the final grooves of the records vary according to the length of the selection recorded thereon, or for other reasons, so that it is necessary that any means intended to close a circuit through the sound arm and motor spindle, as suggested, must be capable of ready adaptation to such varying conditions.

It is also still further desirable that such means may be permanently attached to a record for which the means has or have been adjusted in order that the further playing of the record may be effected from time to time without any further manipulation. Consequently I have devised a conductor which may be permanently attached to the face of a record in adjusted relation therewith and which will serve to insure the closing of such a circuit when the reproducing needle of the phonograph passes over the final or any other predetermined groove of the record, this conductor being illustrated as comprising two parts, which I term the inner and outer parts 11 and 12 of said conductor, the inner part being adapted to be associated electrically with the spindle of the motor and the outer part with the needle of the phonograph when the said parts are in operative relation. The two parts are adapted to be united in an adjusted relation as to combined length in order that they may form a virtually single electric conductor or bridge which is applicable to the face of the record to extend radially from the central orifice of such record to the final or other desirable groove thereof.

Describing the conductor in detail; it will be seen that the inner member 11 is built up from a metal blank 13 of approximately a Y-shaped configuration, the arms of which member are provided with somewhat expanded extremities 14, this blank being interposed between upper and lower paper blanks 15 and 16 interleaved by further paper blanks 17 and 18 which lie immediately above and below the said member 13, all of said blanks being provided with corresponding perforations 19 coincident with the extremities 14 of the arms of the metallic member 13 whereby, after the parts have been assembled and secured together in the manner indicated in Figure 11 by means of any suitable adhesive, the said extremities of the arms and member 13 may be struck up in any suitable manner to form projections 14a extending through the perforations of the paper blank 15 such as in the manner indicated in Figure 12 and clearly shown in Figure 4. The plugs 17 and 18 are also provided with orifices 19 and 20 exposing parts of the stem of said member 13 and permitting the formation thereon of transverse straps 21 by means of a suitable punching operation, the object of which straps will be further explained.

In some cases instead of the blank 13 a blank 22, such as shown in Figures 12 and 14 may be employed, this being similar in all respects to the member 13 except that it is provided with a tongue 23 intermediate its arms thereof, otherwise it is associated with the paper blanks and punched to form the projections 22a and straps thereon in the same manner as on the metallic member 13 already described.

The outer member also includes a forked metallic conductor 24 having an elongated ribbon-like stem 25 and arms 26, the extremities of which are somewhat expanded and have secured thereto the ends of a bowed wire 27, the securing of said wires being by means of riveting, soldering, or in any other convenient or desirable manner. This conductor 24 is mounted on the underside of an elongated paper blank 28 and the head or end forked portion of said conductor is enclosed by a further and shorter paper blank 29, the medial portion of the bowed wire 27 extending beyond the outer ends of said paper blanks and the stem of the conductor loosely extending along the underside of the elongated blank or mount 28. The undersides of said mount 28 and blank 29 are provided with a suitable adhesive whereby they may be applied to and secured upon the surface of a record, the underside of said inner member 11 being also similarly provided with adhesive for a like purpose.

In use, the inner and outer parts are supplied separately to a user in sufficient quantities for the purposes required and in the case of a double record where two inner and two outer members 11 and 12 are required to provide for application to both sides of said record, one of the inner members being of the type provided with the tongue 23, one of each of the inner members is then secured to the centerpart of the disk record on opposite sides thereof so that the central orifices of said members will coincide with the orifice in the center of the disk, as will be readily seen from an examination of Figures 3 and 4 of said drawings in which the disk is numbered 30, and the central orifice thereof 31, 32 being the central orifice of the inner members.

This having been done one of the outer members is then taken and its wire loop positioned over the final groove or any other desired groove on one side of said disk with the opposite end of said conductor extending over the central orifice of the record, and when the correct position of the wire loop on the record has been ascertained then the excess extremity of the conductor extending over the said central orifice of the record is cut off and the free end of the ribbon-like stem 25 of the said conductor is threaded into the transverse straps 21 of the said inner member and the parts are sealed down into position by the provided adhesive. The straps 21 may also be manually depressed with firmer engagement with the stem of the conductor if desired. Thus the inner and outer members form a virtually continuous electric bridge between the central orifice and the desired groove of the record.

The record is then turned over and a second outer member applied in the same manner as adopted in the application of the outer member to the first side of said record with such variation as to the radial adjustment as may be called for according to the differences in position of the final or other groove of the record, as will be readily understood; and either before or after the threading of the stem of the outer conductor into the straps of its inner conductor the tongue of the inner member so provided therewith is bent upwardly or downwardly as the case may be through the central orifice of the record and threaded into the straps of the inner member on the opposite side of said record, whereby the two conductors on such opposite sides of the record are electrically connected together. This arrangement may be readily seen in Figure 3 of the drawing. The said orifice 31 of the record may be provided with a recess or slot 33 at one side of the accommodation of the tongue 23.

To provide for the efficient electrical association of said conductors with the spindle of the phonograph, I may use a contact collar 34 mounted upon a base 35 provided with resilient arms 36 and inwardly extending flexible teeth 37 which teeth engage the said spindle when the collar is passed thereover, the base being adapted to rest on the top of the turn table as shown in Figure 4. This contact ring is impinged upon by the punched parts 14ª or 22ª, as the case may be, of the inner member on the underside of the record, both of said members being adapted to effect such impingement according to which side of the record is lowermost to establish electrical connection between the said spindle and the bowed wire of the conductor on the upper side of said record through the agency of the tongue 23.

It follows that where a record has been equipped in the manner suggested and such record is played upon a phonograph equipped with an electric brake, such as that shown in Figures 1 and 2, the passing of the reproducing needle over that groove to which the bowed wire of the conductor has been set will result in the closing of a circuit through the said electric brake and the actuation thereof thereby stopping the operation of the phonograph; and it will be further apparent that this action will take place at the same moment every time such record is played without any special preparation or adjustment prior to the playing of the record.

To indicate a form of electric brake which I prefer to use in association with the device already described, reference may be had to Figures 1, 2, 19, 20, 21, 22, and 23, wherein the brake 7 is indicated as including a pair of electro-magnets 38 adapted when energized to actuate an armature comprising a latch plate 39 mounted on telescopic supports 40 and normally raised by springs 41. 42 and 43 are the binding posts connected with the said electro-magnets and adapted to receive the wires 10 and 9ª, as indicated in Figure 1.

The brake proper comprises an eccentric 44 carried by a spindle 45 rotatably mounted in a swingable arm 46 extending from a pivot 47 rotatable in the casing of the electric brake and provided with an adjustable stop 48 which is adapted to limit the outward swinging of said arm 46; 49 being a spring which effects such outward swinging when permitted to do so by the unlocking of the arm when the latch plate 39 is depressed by the action of the electro-magnets, or by the manual depression of a button 50.

This locking of the said arm is effected by the co-acting of a spring-pressed member 51 with one or other of notches 52 and 53 in the latch plate when the said latch plate is in its raised position, and the said member 51 is brought into juxtaposition with the said notches. The said member 51 is carried by a rotary plate 54 mounted upon the spindle 45 of the brake proper beneath the arm 46 and adapted to rotation manually by a handle 55 which is provided for that purpose. The said plate 54 has attached thereto at 56 a spring 60 which more or less encircles the end of the arm 47 and is connected thereto at 57, this spring tending to rotate the spindle 45 in the direction indicated by the arrow in Figure 19; and in setting the brake in its inoperative position, whereby the operation of the phonograph is permitted, the said handle is rotated in the opposite direction to that indicated by the said arrow whereupon the spring-pressed member 51 is caused to pass over and engage with one or other of the notches 52 or 53 of the raised latch plate 39, thus locking the eccentric 44 in its retracted position which is that clearly illustrated in Figure 21.

58 indicates a loose sleeve mounted on the eccentric and provided with a cover 59 of rubber or other material suitable for frictional engagement with the edge of the turn table or disk record of the phonograph, and it will be understood that upon the energizing of said magnets by the closing of a circuit through the said conductor 11 and 12, all as hereinbefore described, the said latch plate will be depressed thereby releasing the spring pressed member 51 from its engagement therewith and permitting the rotation of the spindle 45 and eccentric 44 by the spring 60, thereby causing the eccentric motion of the sleeve 58 and the engagement of its covering with the edge of the turn table or disk whereupon the motion of the said turn table or disk is arrested.

It is desirable that provision should be made for the prevention of wastage of current in the event of the wire 27 of the conductor coming into contact with the reproducing needle, and to this end I provide the electric brake with a contact breaker 61 in the form of a plate mounted on a depressable support 62 which carries a contact 63 adapted to be disconnected from the inner end of the binding post 43 when the said plate 61 is depressed by an abutment 64 extending downwardly from the periphery of the plate 54 for that purpose.

The electric brake described is quite sensitive and very efficient in operation, bringing the turn table of the phonograph to rest in an easy manner without undue strain or vibration, and where the improved conductor is attached to a record, as set forth herein, the stopping of the phonograph upon the completion of the playing of the same record and at the same period in every playing of such record is brought about with great precision and certainty.

This invention may be developed within the scope of the following claims without departing from the essential features of said invention and it is desired that the specification and drawings be read as being merely illustrative and not in a limiting sense, except as necessitated by the prior art.

What I claim is:—

1. An attachment for phonograph disc records, comprising an electric conductor of two-part construction adapted to be joined together to form a device extending from the center bore of a record a required radial distance therefrom to overlap a determined groove in the record and means whereby said conductor may be secured in position on said record.

2. A device of the type claimed in the prior claim, wherein one of the parts is adapted to be cut to required length and joined to the other of said parts.

3. A device according to claim 1 wherein the securing means is in the form of an adhesive mount carrying the conductor.

4. An electric conductor for phonograph disc records, comprising an elongated metallic conductor having end terminal portions, and a mount carrying said conductor and adapted to be secured to the surfaces of a record.

5. Electric conducting means for a centrally bored double disc record, comprising a pair of conductors adapted to be secured on opposite sides thereof radially from said bore, and conducting means carried by and extending through the bore of said record and electrically connecting both of said conductors together.

6. A device according to claim 5 wherein one of said conductors is provided with an extension and the other with means for the reception of such extension, whereby said extension may be passed through the bore of a record and secured to the other conductor when the conductors are applied to said record.

7. A conductor of the type described comprising an inner contact member and an outer contact member, one of said members being provided with an extended stem adapted to be cut to any required length, and the other of said members being adapted to receive said stem.

8. A conductor for radial attachment to the surface of a record as described, comprising an elongated metallic member, a head at one end thereof, a resilient contact extending in bowed formation outwardly of said head.

9. A conductor for radial attachment to the surface of a record as described, comprising an elongated metallic member, a head at one end thereof, and a wire bow extending from said head in a manner adapting it to longitudinally overlie a groove of a record to which the conductor is applied.

10. A device of the type described comprising a metallic conductor and a mount carrying said conductor, said conductor being adapted to adjustment as to length and to permanent attachment to the surface of a disc record for the purposes specified.

11. A device according to claim 10 in combination with a further conducting member attachable to the opposite side of a record and means electrically connecting said metallic conductor with said further conductor.

12. In combination with a disc record having a central orifice, a conductor permanently secured to the surface thereof and extending from said central orifice to a desirable groove of said record, a further conductor on the opposite side of said record adjacent said orifice, and means carried by said record and passing through said orifice electrically connecting the two conductors together.

13. The combination according to claim 12 wherein the wall of said orifice is recessed for the reception of said connecting means.

14. In combination with a phonograph and a record, an electrically operable brake including a brake roller, an eccentric upon which said roller is mounted, means rotating said eccentric into braking position, an electrically releasable retaining latch normally preventing the rotation of said eccentric, and circuit closing means permanently attached to the record and electrically associated with said brake.

15. In combination with a disc record having a central orifice adapted for the reception of the spindle of a phonograph, a conductor member applicable to the upper surface of said record whereby it extends radially from said orifice, a contact member applicable to said spindle beneath said record, and means establishing connection between said conductor and said contact member.

In testimony whereof I affix my signature in presence of two witnesses.

HERMAN W. TROEGER.

Witnesses:
T. LIGHTFOOT,
ANNA M. DORR.